(12) United States Patent
Wongwirawat et al.

(10) Patent No.: US 7,342,981 B2
(45) Date of Patent: Mar. 11, 2008

(54) DIGITAL RECEIVER HAVING ADAPTIVE CARRIER RECOVERY CIRCUIT

(75) Inventors: Supat Wongwirawat, Langhorne, PA (US); Azzedine Touzni, Doylestown, PA (US); Mark Hryszko, Doylestown, PA (US); Raul A. Casas, Doylestown, PA (US); Yiwen Yu, Holland, PA (US)

(73) Assignee: ATI Technologies Inc., Thornhill, Ontario (CA)

( * ) Notice: Subject to any disclaimer, the term of this patent is extended or adjusted under 35 U.S.C. 154(b) by 706 days.

(21) Appl. No.: 10/757,536

(22) Filed: Jan. 15, 2004

(65) Prior Publication Data

US 2005/0157820 A1 Jul. 21, 2005

(51) Int. Cl.
 H04L 27/14 (2006.01)
 H04L 27/16 (2006.01)
 H04L 27/22 (2006.01)

(52) U.S. Cl. ............... 375/326; 375/340; 375/316; 375/324; 375/233; 375/229; 708/323

(58) Field of Classification Search ........ 375/326, 375/340, 316, 324, 233, 229; 708/323
See application file for complete search history.

(56) References Cited

U.S. PATENT DOCUMENTS

| | | | |
|---|---|---|---|
| 4,691,176 A | 9/1987 | Hsiung et al. | |
| 5,604,648 A * | 2/1997 | Oh | 360/73.11 |
| 5,703,597 A | 12/1997 | Yu et al. | |
| 5,712,873 A * | 1/1998 | Shiue et al. | 375/233 |
| 6,018,556 A | 1/2000 | Janesch et al. | |
| 6,418,164 B1 * | 7/2002 | Endres et al. | 375/232 |
| 6,668,014 B1 * | 12/2003 | Endres et al. | 375/232 |
| 6,671,339 B1 * | 12/2003 | Ahn | 375/346 |
| 6,696,886 B1 * | 2/2004 | Ke et al. | 327/553 |
| 6,868,129 B2 * | 3/2005 | Li et al. | 375/324 |
| 7,027,500 B1 * | 4/2006 | Casas et al. | 375/232 |
| 2002/0080516 A1 * | 6/2002 | Bhakta et al. | 360/77.02 |

OTHER PUBLICATIONS

Richard Citta & Gary Sgrignoli, "ATSC Transmission System: VSB Tutorial", Zenith Electronics Corporation, Montreuz Symposium, Jun. 12, 1997.

* cited by examiner

Primary Examiner—Chieh M. Fan
Assistant Examiner—Aristocratis Fotakis

(57) ABSTRACT

A digital receiver, that may be used to receive VSB/QAM digital television signals, includes an adaptive fine carrier recovery circuit that compensates for deviations in the carrier frequency or phase. The carrier recovery circuit de-rotates a signal including phase errors. Estimations of phase errors are filtered using a filter whose gain and bandwidth are adjusted adaptively. This allows the carrier recovery circuit to track phase/frequency offset without introducing significant jitter. In one embodiment, the receiver includes a DFE, and the adaptive carrier recovery circuit mitigates instability that might be associated with the DFE.

44 Claims, 9 Drawing Sheets

DIGITAL RECEIVER HAVING ADAPTIVE CARRIER RECOVERY CIRCUIT

FIELD OF THE INVENTION

The present invention relates generally to digital signal receivers and more particularly to a receiver including an adaptive carrier recovery circuit and methods for such receivers.

BACKGROUND OF THE INVENTION

In many modern digital transmission systems, digital transmitters modulate digital information onto radio frequency carrier signals. The modulated information signals are propagated to digital signal receivers where the digital signals may be demodulated and decoded.

For example, quadrature amplitude modulation (QAM), as detailed in International Telecommunications Union (ITU) recommendation ITU-T J.83B/SCTE DVS-031/DOCSIS, and vestigial side-band (VSB) modulation, as detailed in the Advanced Television Standard Committee (ATSC) standard A53/B, are two common digital modulation techniques that are used for cable and terrestrial digital television broadcast.

Invariably, propagation media for the signals introduce distortions in signals received at the receiver. Distortions may, for example, be introduced as a result of noise, phase shifts, signal attenuation, and multi-path interference. Imperfections at the transmitter may similarly introduce distortions in the transmitted signal. Ultimately, these distortions may manifest themselves as increased bit errors in the decoded digital signal at the receiver.

To reduce the overall bit error rate in the decoded signals, introduced distortions may be compensated in numerous ways. For example, to mitigate the effects of additive noise, the digital signals may include forward error correcting (FEC) codes. One or more equalizers may be used at the receiver to compensate for phase and amplitude distortions introduced into the transmitted signal by the propagation medium, such as multipath distortion.

For a terrestrial radio-frequency (RF) propagation medium, the characteristic of the propagation medium varies in dependence on a number of factors, including the location of the receiver. Accordingly, any equalizer at the receiver is typically adaptive and allows its parameters to be matched to the propagation medium at the receiver. The equalizer should also be able to compensate for variations in the propagation medium over time.

An example digital receiver including an adaptive equalizer is, for example, more particularly detailed in U.S. Pat. No. 6,418,164, the contents of which are hereby incorporated by reference. As disclosed, a conventional digital receiver may include a feed forward equalizer (FFE), a decision feedback equalizer (DFE), and a carrier recovery circuit, each designed to compensate for distortion in the received signal.

The FFE and DFE minimize multipath inter-symbol interference. Specifically, the FFE mitigates the effect of delayed echo multipath distortion ("pre-cursor"), while the DFE minimizes leading ("post cursor") multipath interference. Error metrics between the demodulated signal and the reconstructed signal are used to provide closed loop adjustment of equalizer parameters. The carrier recovery circuit compensates for shifts in phase and/or of the carrier frequency of the broadcasted signal. The aim is to adjust simultaneously FFE and DFE equalizer and carrier recovery circuit parameters to compensate for the propagation medium distortion. A blind equalization technique using for example, the Constant Modulus Algorithm (CMA), may be used to adjust equalizer parameters.

Although very effective for channels having static characteristics, the disclosed receiver may not be able to track fast changes in the carrier frequency or phase. This is particularly acute when the receiver is used to receive VSB modulated signals, which are highly carrier dependent. Indeed, for VSB signals phase distortion affects real and complex values of the VSB constellation differently. Furthermore, a CMA will not be phase independent when applied to a signal modulated with a VSB constellation, as it is with a QAM modulation for example.

Accordingly, there is clearly a need for a receiver including a carrier recovery circuit that can track quick changes in carrier phase/frequency without otherwise impacting the overall performance of the receiver.

SUMMARY OF THE INVENTION

A digital receiver includes an adaptive fine carrier recovery circuit that compensates for deviations in the carrier frequency or phase. The fine carrier recovery circuit de-rotates a signal including phase errors. Estimations of phase errors are filtered using a filter whose gain and bandwidth are adjusted adaptively. This allows the carrier recovery circuit to track phase/frequency offset without introducing significant jitter. In one embodiment, the receiver includes a DFE, and the adaptive carrier recovery circuit mitigates instability that might be associated with the DFE.

In accordance with an aspect of the present invention, there is provided a digital receiver for demodulating a digital signal modulated onto a carrier, includes a tuner; an analog to digital converter, for digitizing a channel tuned by the tuner to provide a digitized channel; a coarse carrier recovery circuit for extracting the signal from the digitized channel at near baseband; a feed forward equalizer receiving the signal at near baseband and outputting a feed forward equalized signal; a fine carrier recovery circuit for phase shifting the feed forward equalized signal by a phase correction angle to adjust for remaining offsets in phase and frequency of the feed forward equalized signal attributable to phase and frequency offsets in the carrier. The fine carrier recovery circuit includes a filter for filtering an estimate of a phase error in the carrier to control the phase correction angle. At least one filter parameter of the filter varies adaptively with the phase error.

In accordance with another aspect of the present invention there is provided, in a digital receiver for receiving a signal modulated onto a carrier, a method includes reducing multipath interference in the signal, by filtering the signal through a feed-forward equalizer to produce a feed forward-equalized signal; determining an estimate of a remaining phase error in the carrier; filtering the estimate through a filter having at least one adjustable filter parameter to produce a phase correction signal; varying the adjustable parameter with the estimate of phase error; and multiplying the feed forward equalized signal by the phase correction signal to de-rotate the feed forward equalized signal.

In accordance with yet another aspect of the present invention there is provided a digital receiver for demodulating a digital signal modulated onto a carrier, to produce a demodulated digital signal. The receiver includes a de-rotator for phase shifting an equalized version of the digital signal by a phase correction angle to adjust for remaining offsets in phase and frequency of the equalized version of the digital signal attributable to phase and frequency offsets in the carrier, and a filter in communication with the de-rotator, for filtering an estimate of a phase error in the demodulated digital signal to control the phase correction angle. At least one filter parameter of the filter varies adaptively with the phase error.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

Figure 1:
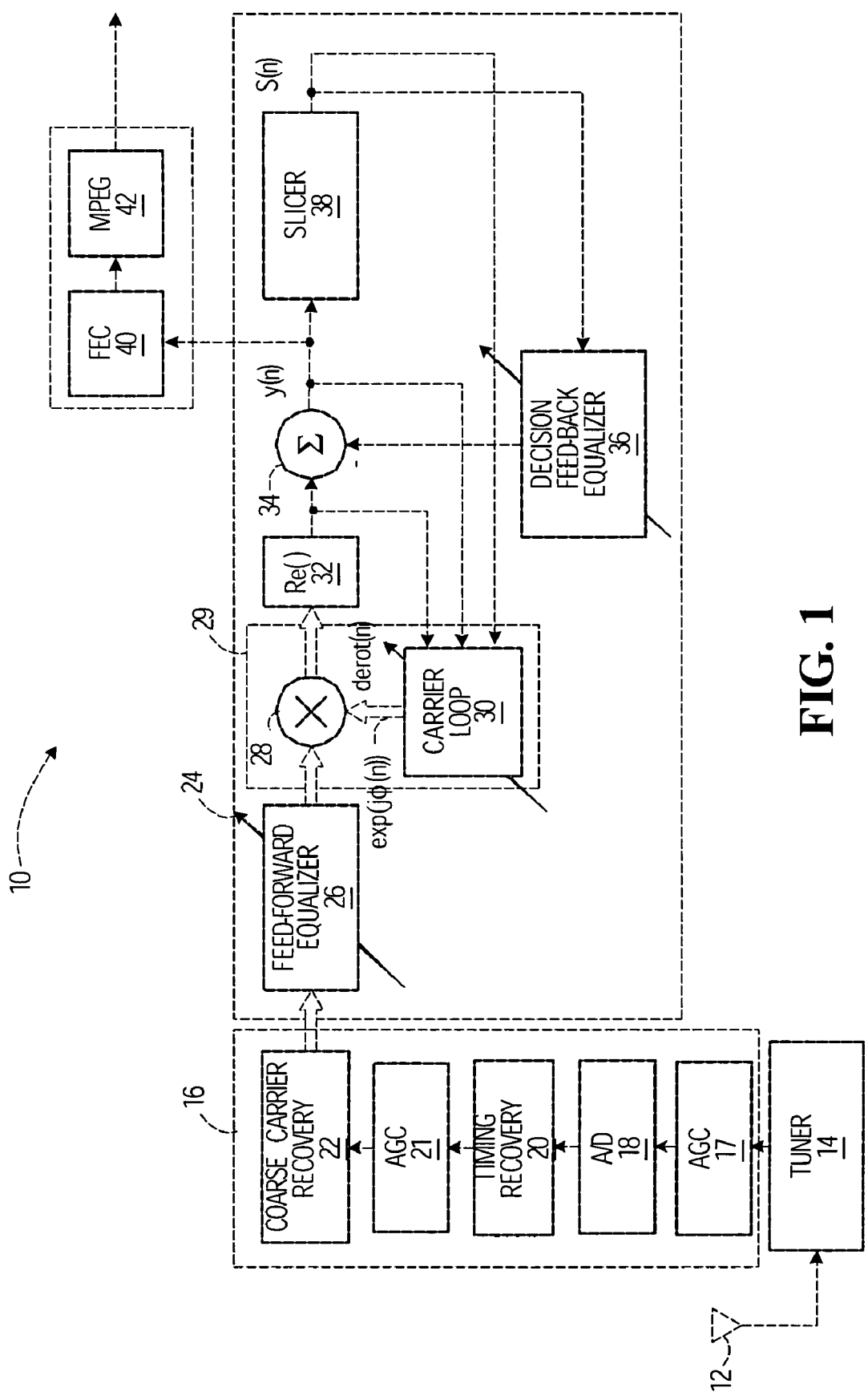
FIG. 1 is a simplified schematic block diagram of a VSB receiver exemplary of an embodiment of the present invention.

FIG. 1 illustrates a VSB receiver 10, including a carrier recovery circuit 29, exemplary of an embodiment of the present invention. VSB receiver 10 may for example be used to receive a digital television signal, as specified by the Advanced Television Systems Committee (ATSC) in the standard A53/B. Receiver 10 may be formed as an integrated circuit using conventional application specific integrated circuit manufacturing techniques.

Receiver 10 is interconnected to an antenna 12, providing a radio frequency signal to a tuner 14. Tuner 14, in turn selects a tuned ATSC digital 6 Mhz wide channel of interest at an assumed frequency in a conventional manner. Tuner 14 translates the tuned channel to an intermediate frequency (IF) so that all channels can be processed at a single unique frequency by the receiver front end 16. Front end 16 scales the received channel by automatic gain control amplifier 17 to allow the channel to be digitized by analog to digital (A/D) converter 18. A/D converter 18 samples the analog channel at the IF frequency and provides a digital signal corresponding to the digitized channel at second IF frequency. The digitized channel is passed to timing recovery block 20 where timing information is extracted, in a manner understood by those of ordinary skill. The timing information establishes the clock rate and phase at which symbols forming the signal of interest modulated on the carrier are detected. The digitized channel is optionally amplified by automatic gain control (AGC) block 21 to ensure the magnitude samples of channels are optimal for processing by the remainder of receiver 10.

The digitized channel is converted to near baseband through a frequency shift based on the assumed carrier frequency, at coarse carrier recovery circuit 22. Coarse carrier recovery circuit 22 may be formed in any number of ways appreciated by those of ordinary skill. Coarse carrier recovery circuit 22 may for example be formed as a frequency and phase-locked loop adapted to detect and lock to a low level pilot signal contained in the received ATSC VSB channel. In any event, coarse carrier recover circuit 22 extracts a near baseband digital signal that is provided to feed-forward equalizer circuit 24. The signal provided is complex and thus includes two parallel data streams.

As will be appreciated, the description of front end 16 is exemplary only. A suitable front end 16 could be formed in many ways. For example, the order of coarse carrier recovery circuit 22 and timing recovery block 20 could be reversed. A person of ordinary skill will recognize many other design alternatives.

Input to detection circuit 24 includes the sequence of VSB data symbols corrupted by noise, phase shifts, and inter-symbol interference. In particular, the signal includes errors due to variations in carrier phase/frequency caused by carrier phase noise, not compensated for by carrier recovery circuit 22.

Feed-forward equalizer 26 in conjunction with decision feedback equalizer 36 corrects signal degradation resulting from inter-symbol interference by filtering the input signal to detection circuit 24 and the output of slicer 38 with digital filters having variable coefficients. Exemplary FFE 26 is a linear adaptive filter having complex coefficients. FFE 26 may be formed as a finite impulse response (FIR) filter having complex coefficients, as detailed in "Current approaches to blind decision feedback equalization", by R. A. Casas, T. J. Endres, A. Touzni, C. R. Johnson, Jr. in Signal Processing Advances in Wireless and Mobile Communications—Trends in Channel Estimation and Equalization. Vol 1. Chap 11, pp. 367-415, 2000.

FFE 26 takes complex valued data from coarse carrier recovery circuit 22. By using complex values instead of a real values filter, the equalization performance of the FFE 26 is improved. However, errors due to variations in carrier phase/frequency caused by carrier phase noise are still present after FFE 26.

As such, the carrier phase/frequency error is corrected using a carrier recovery circuit 29. Such correction is referred to as "de-rotation". Example carrier recovery circuit 29 includes a carrier loop 30 and a mixer/multiplier 28. Carrier recovery circuit 29 multiplies the signal output at FFE 26 by a sinusoidal signal produced by carrier loop 30 to produce a complex output, derot(n), for each symbol modulated onto the carrier. The multiplication rotates the modulated signal points about the origin of the signal plane. Multiplication by the sinusoidal signal compensates for any phase/frequency deviation of the carrier signal, as detailed below. At steady state, carrier recovery circuit 29 tracks the frequency and phase of the signal. Common approaches for signal de-rotation are, for example, detailed in, Meyr et al., Digital Communication Receivers, John Wiley & Sons, 1998.

As receiver 10 is a VSB receiver, the signal information is carried in the real component of the modulated symbols. The real component of the output of carrier recovery circuit 29, derot(n), extracted at block 32 and provided to slicer 38. Slicer 38 produces a demodulated, quantized signal S(n) of the real value of the complex signal constellation.

A DFE 36 filters a version of the quantized output signal S(n), and subtracts this version to the output derot(n) of carrier recovery circuit 29 to form y(n), which is a real valued estimation of the transmitted complex symbol, provided to the input of slicer 38.

DFE 36 in conjunction with FFE 26 mitigates the effects of multipath interference. DFE 36, like FFE 26 may be formed as an adaptive FIR filter, as detailed in "Current approaches to blind decision feedback equalization", supra.

DFE 36 is a linear adaptive filter having real values for both data and coefficients. DFE 36 mitigates post-cursor multi-path interference by feeding back symbol estimates from the slicer 38. However, DFE 36 easily becomes unstable especially when the output of the FFE has not been properly corrected in phase. Indeed, in this case, even a perfect inter-symbol correction provided by FFE 26 and DFE 36 may not compensate for a phase distortion of the output of FFE filter. This induces a compression of the soft estimation y(n) that may trigger an erroneous decision of the slicer 38. That is, an erroneous decision of slicer 38 will be propagated in the DFE 36 and may lead to less effective inter-symbol equalization by DFE 36. This is particularly acute for VSB modulated data since DFE 36 operates on real data, and carrier information is lost. In such circumstances DFE 36 cannot carry any phase information as FFE 36 does.

For VSB modulation such as in ATSC A53/B, for each modulated symbol, slicer 38 decodes y(n) to produce a 8-level or a 16-level discrete VSB symbol S(n) corresponding to the real value contribution of the complex 8/16-VSB constellation broadcasted by the transmitter. Each VSB symbol S(n) corresponds to an allowable VSB constellation. If slicer 38 is adapted to decode 8-VSB signals, each data symbol takes on one of eight relative values: −7, −5, −3, −1, 1, 3, 5, and 7. For 16-VSB signals, each data symbol takes on one of sixteen relative values: −15, −13, −11, −9, −7, −5, −3, −1, 1, 3, 5, 7, 9, 11, 13, 15. As will be appreciated, slicer 38 may be formed as a trellis decoder to optimally decode the VSB signals. As will become apparent, the signal S(n), the input y(n) to slicer 38 and the output of block 34 are used to estimate the carrier phase error by computing appropriate error metrics. The metrics are calculated by carrier loop 30, as detailed below. A similarly calculated error metric is also provided to FFE 26 and DFE 36 to adjust their filter parameters. Operating parameters of DFE 36 and FFE 26 may be adjusted using a simplified decision directed constant modulus algorithm and the approximated phase error, as detailed in U.S. Pat. No. 6,337,878, the contents of which are hereby incorporated by reference.

As will be appreciated, for ATSC signals, the sequence of symbols y(n) are organized as frames. FEC decoder 40 receives the input y(n) to slicer 38, and further corrects errors in the demodulated digital signals using FEC. The corrected decoded data is provided to a decoder 42, which may be a MPEG-2 decoder, or the like, to provide audio and video data of interest.

Figure 2:
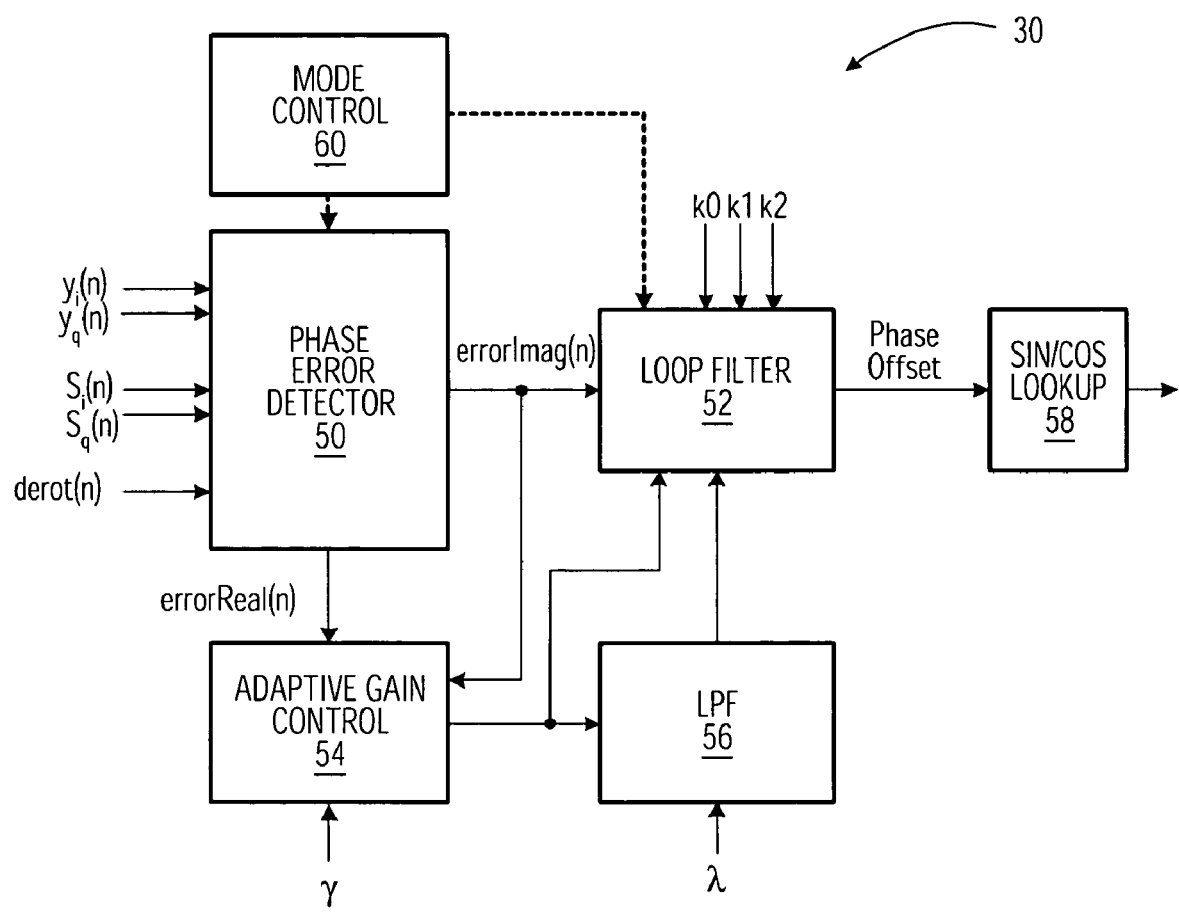
FIG. 2 is a simplified schematic block diagram of a carrier loop of the receiver of FIG. 1.

FIG. 2 further illustrates an example carrier loop 30, exemplary of an embodiment of the present invention. As illustrated, carrier loop 30 includes a multi-mode carrier phase error detector 50, a loop filter 52, an adaptive gain circuit 54, a low pass filter 56 to filter the output of adaptive gain circuit 54, a sine/cosine generator 58, and a mode control block 60.

Mode control block 60 assumes a number of states based on the state of receiver 10 (e.g. initial signal acquisition mode, tracking mode, etc.) and the quality of the received signal, and generates control signals to select the appropriate phase error detector 50, and to loop filter 52 controlling one of multiple modes of operation of each of detector 50 and loop filter 52, as detailed below.

Example carrier phase error detector 50 computes the phase error in the carrier from three inputs: input to slicer 38 (y(n)—FIG. 1), carrier corrected output of FFE 26 (real component of the complex valued derot(n)); and output of slicer 38 (S(n)). Using these inputs, detector 50 estimates the error that is caused by offset between carrier frequency and phase at the receiver and transmitter. Phase error in the carrier may be estimated in a number of ways. For example, phase error may be estimated by calculating the phase difference between the demodulated signal at the input and output of slicer 38.

Example carrier phase error detector 50 includes seven phase error detector calculation blocks illustrated in FIGS. 3A-3E, FIGS. 4A-4B to calculate metrics to estimate the error in the imaginary (errorImag(n)) and real part (errorReal(n)) of the demodulated signal. These blocks are labelled DD_CL (block 62a—FIG. 3A), DD_CL_ALT (block 62b—FIG. 3B), MSE_SINGLE_CL_I (block 62a—FIG. 3C), MSE_SINGLE_CL_Q (block 62d—FIG. 3D), QPSK_CL (block 62e—FIGS. 3E and 64a—FIG. 4A) and other (block 64b—FIG. 4B).

Figure 3A:
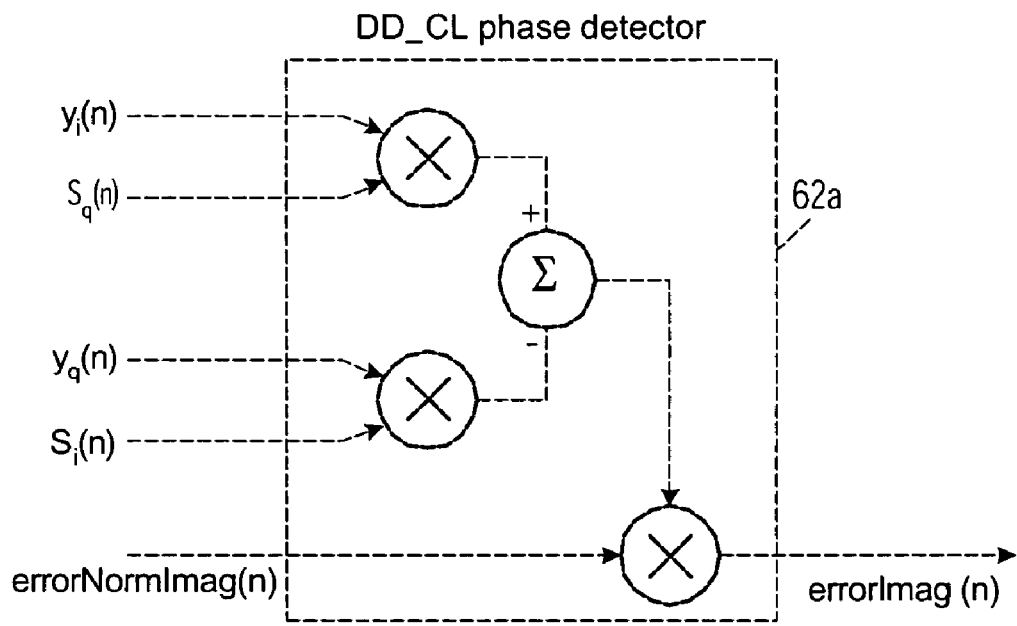
FIG. 3A-3E, 4A-4B and 5A-5B are simplified block diagrams of portions of a phase error detector of the carrier loop of FIG. 2.
Figure 3B:
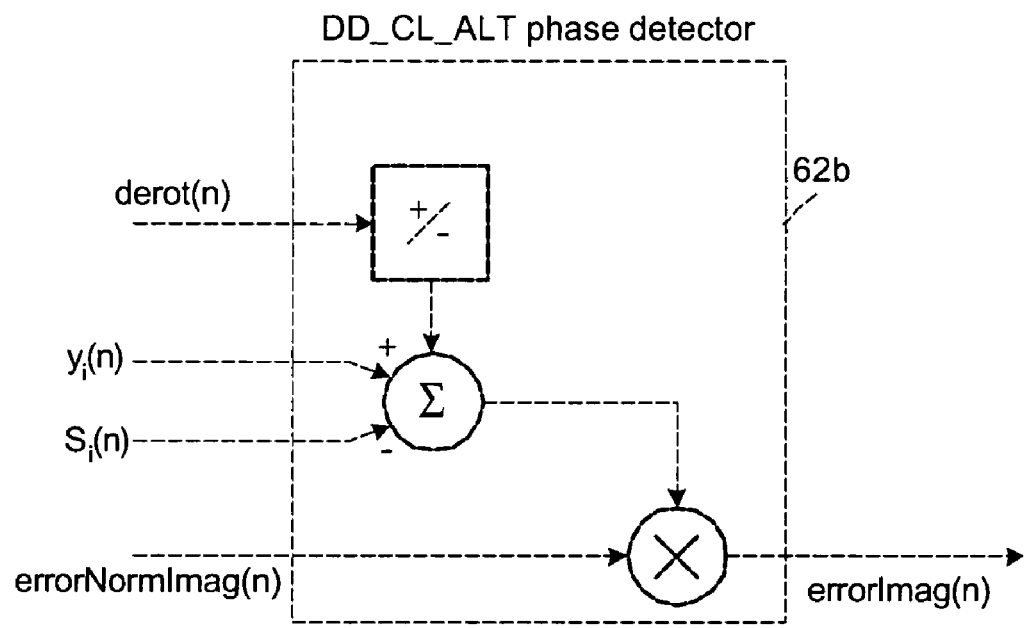

To appreciate the operation of blocks 62a-62e and 64a-64e, it may be noted that if y(n) and S(n) were complex signals, and if $y_i(n)$ and $y_q(n)$ denote respectively the real value and the imaginary contribution of the complex value y(n), and if $S_i(n)$ and $S_q(n)$ denote respectively the real value and the imaginary contribution of the complex value S(n), errorImag(n) may be determined as:

$(y_i(n)*S_q(n)-y_q(n)S_i(n))*$errorNormImag (block 62a, FIG. 3A);

sign(derotq(n))*$(y_i(n)-S_i(n))*$errorNormImag (block 62b, FIG. 3B);

where sign(derotq(n)) extracts the sign of derot(n)

Figure 3C:
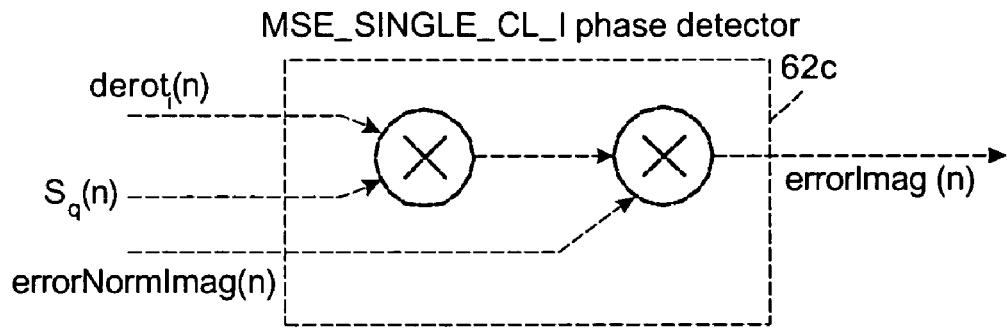
Figure 3D:
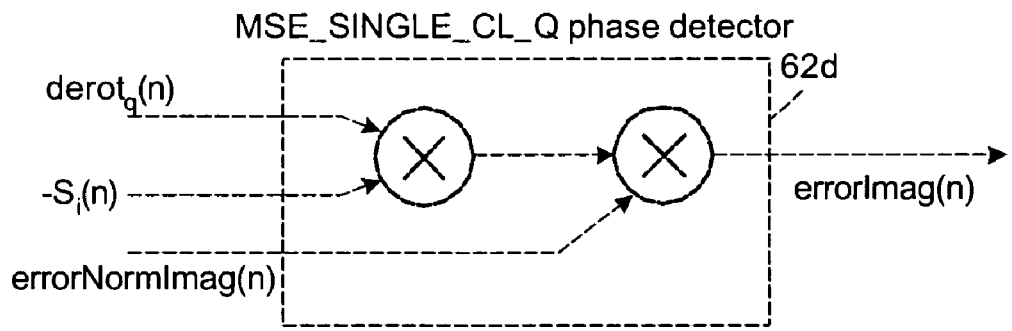
Figure 3E:
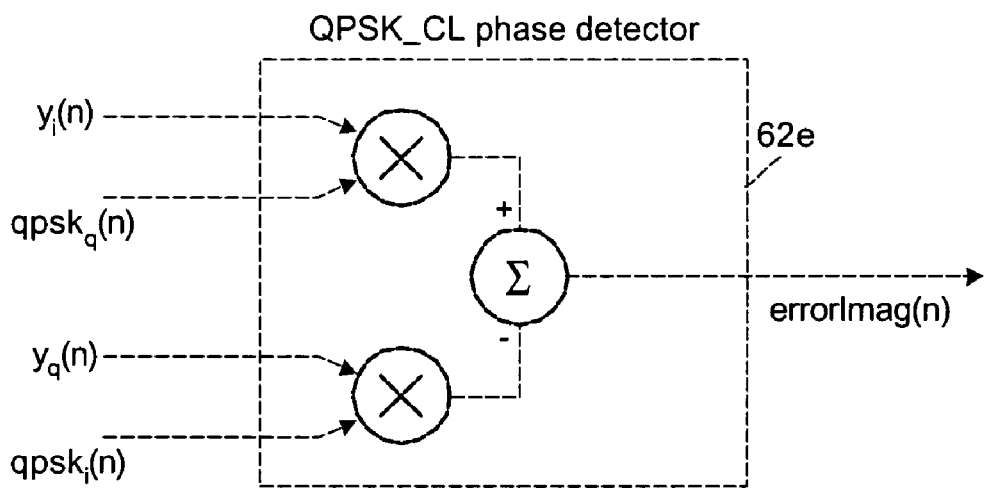
Figure 4A:
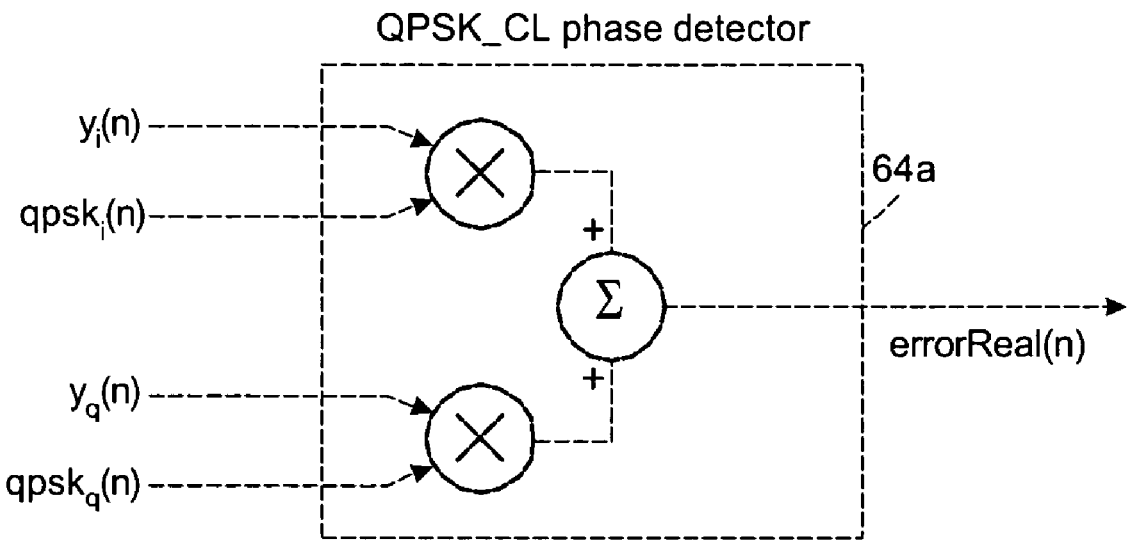
Figure 4B:
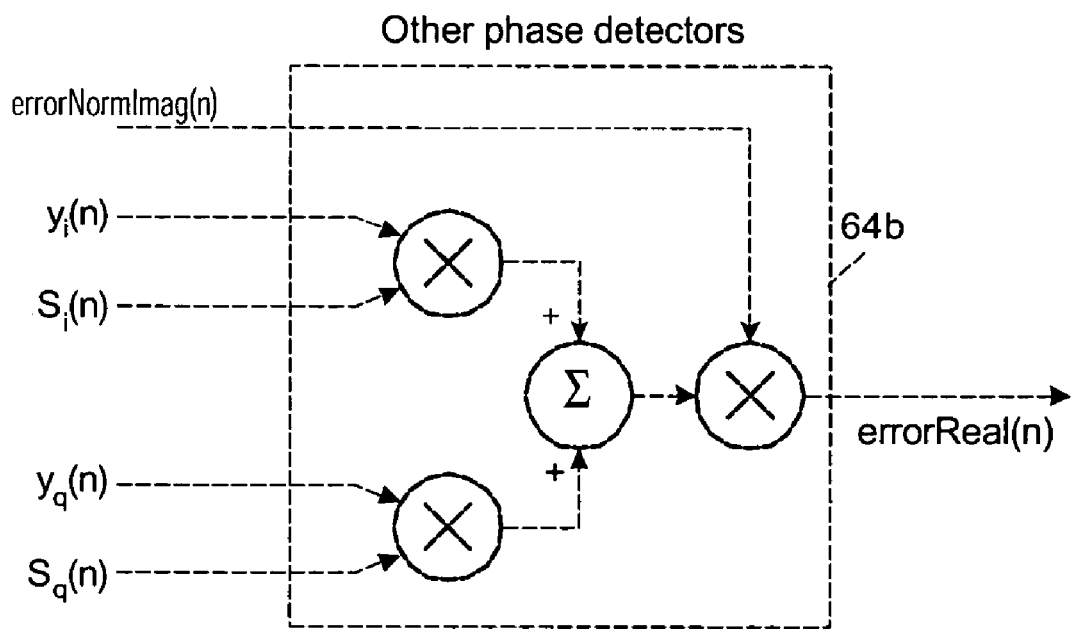
Figure 5A:
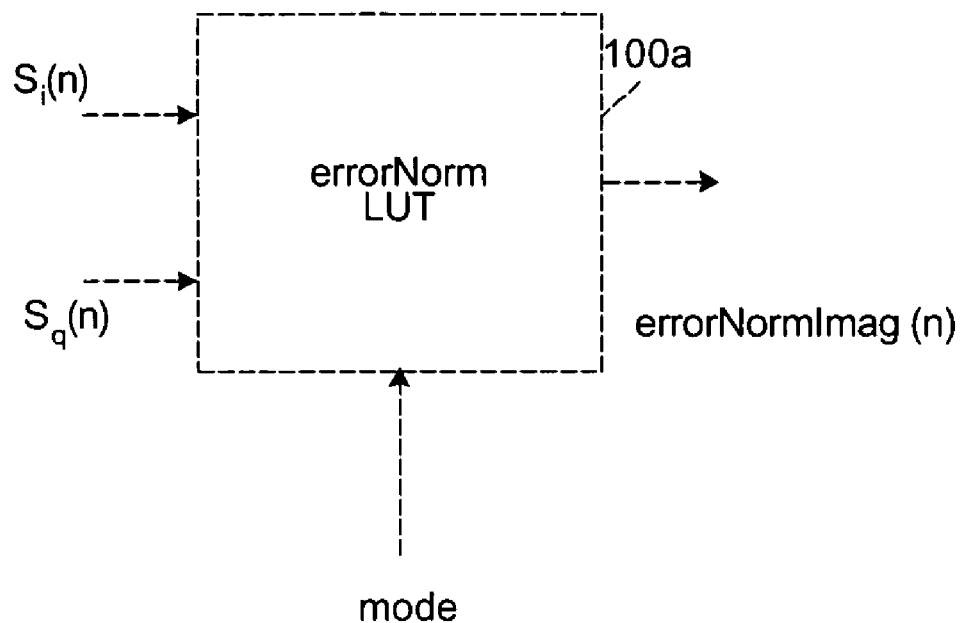
Figure 5B:
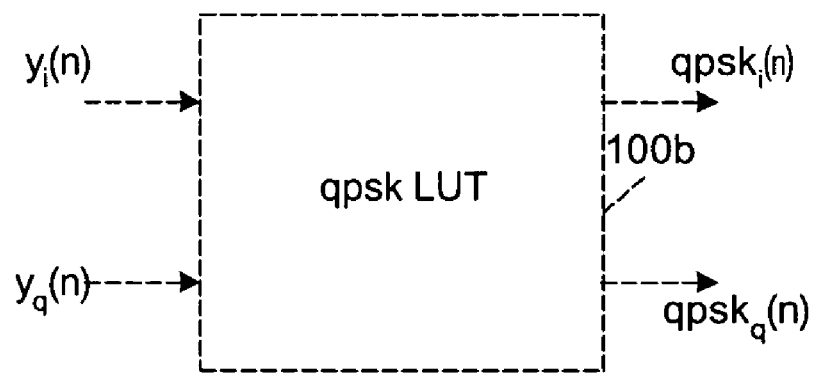

$derot_i(n)*S_q(n)*$errorNormImag (block 62c, FIG. 3C);

$-derot_q(n)*S_i(n)*$errorNormImag (block 62d, FIG. 3D); or $y_i(n)*qpsk_q(n)-y_q(n)*qpsk_i(n)$ (block 62e, FIG. 3E);

Similarly, errorReal(n) may be determined as, $(y_i(n)*qpsk_i(n)+y_q(n)*qpsk_q(n))$ (block 64a, FIG. 4A); or $(S_i(n)*y_i(n)+S_q(n)*y_q(n))*$errorNormImag, (block 64b, FIG. 4B);

where errorNormImag(n), and errorRealnorm(n) may be derived from the magnitudes of $S_i(n)$ and $S_q(n)$. These normalization factors normalize the amplitude of the different metrics and thus the phase error estimation resulting form the metrics. The normalization factors are formed from $S_i(n)$ and $S_q(n)$ typically using a look-up table by block 100a, of phase error detector 50 illustrated in FIG. 5B.

errorNormImag may be calculated by block 100a as, errorNormImag=$1/(2\pi*(|S_i(n)|+|S_q(n)|))$, where $|S_i(n)|$ and $|S_q(n)|$ denote respectively the magnitude of $S_i(n)$ and $S_q(n)$.

For the error metric calculated by block 62b, the normalization factor can be simplified to errorNormImag=$1/2\pi*|S_i(n)|$, since $S_q(n)$ can be considered zero. For metrics calculated by blocks 62c and 62d, errorNormImag=$1/2\pi*(|S_q(n)|)$ since $S_i(n)$ can be interpreted as a null component. Usually a minimal normalization value is applied when both components are close to zeros.

$qpsk_i(n)$ and $qpsk_q(n)$ are quadrature phase keyed approximations of $y_i(n)$ and $y_q(n)$, respectively. These are formed from $y_i(n)$ and $y_q(n)$ using a look-up table by block 100b, of phase error detector 50 illustrated in FIG. 5B.

Specifically, block 100b forms qpsk$_i$(n) and qpsk$_q$(n) as follows:

qpsk$_i$(n)=1/(16*π) if y$_i$(n)>0 and
qpsk$_i$(n)=−1/(16*π) if y$_i$(n)<0,
qpsk$_q$(n)=1/(16*π) if y$_q$(n)>0 and
qpsk$_q$(n)=−1/(16*π) if y$_q$(n)<0

No normalization is required for the qpsk calculations as these are already normalized.

For VSB modulation, S(n) and y(n) are real. The following may be used to assess phase error using blocks 62a-62e and 64a and 64b and 100a and 100b. The input S$_i$(n) and S$_q$(n) and the output y$_i$(n) and y$_q$(n) are interpreted as follow:

S$_i$(n)=S(n), S$_q$(n)=S(n−1)
y$_i$(n)=y(n), y$_q$(n)=y(n−1)

The inputs for the exemplary QPSK phase detector are:
qpsk$_i$(n)=qpsk(n), qpsk$_q$(n)=qpsk(n−1)

Phase error detector 50 thus generates two error signals; errorImag(n) and errorReal(n) using one of blocks 62a-62e for errorImag(n), and block 64a for errorReal(n) when 62e is used for errorImag(n) and block 64b for errorReal(n), for all other phase detector functions are used.

Typically for QAM modulation the errorImag(n) phase detectors 62a, 62e and the errorReal(n) error signals 64a and 64b are the only signals used to compute the phase/frequency estimation.

Specifically, mode control block 60 provides a signal to select one of three modes to phase error detector 50 reflective of whether the quality of the received signal demonstrates high reliability; low reliability; or intermediate reliability. The quality of the received signal may be assessed in any number of ways by mode control block 60, including measuring errors in reference/training portions of the received signal, measuring the signal to noise ratio, measuring the evolutions of the equalizer coefficient over time, measuring estimates of the signal spectrum over time, measuring variations of the signal in time, etc. or any suitable combinations of such measurements. Mode control block 60 may accordingly additionally be provided with signals allowing such measurements.

Typically the results of block 62a or 62b (FIGS. 3A, 3B), DD_CL or DD_CL_ALT and block 64b (FIG. 4B), may be used when the signal is reliable and the receiver 10 is tracking the demodulated signal. In one embodiment, the reliability of the signal may be estimated by monitoring the variance of symbols y(n) over time in conjunction with a measure of variance over time of one or multiple coefficients of the DFE 36 and FFE 26. The results of block 62e (FIG. 3E) and block 64a (FIG. 4B—QPSK_CL) may be used for a low reliability signal, exhibited by high variance coefficients. Typically, these phase detectors will be used during a cold start initialisation of the receiver. Practically, the output of blocks 62e and 64a (QPSK_CL detector) may, for example be used for ATSC signals after frames are detected. The results of block 62c or 62d (FIGS. 3C, 3D—MSE_SINGLE_CL_I, MSE_SINGLE CL_Q) and block 64b (FIG. 4B—Other) may be used between these extreme signal conditions, such as for example, in the presence of an atypical event, which may lead to the loss of signal equalization. Atypical events include burst noise detection, abrupt change is signal gain, high jitter in the output of blocks 62a or 62b or abrupt changes in the adaptation of the coefficients of the FFE 26 or DFE 36.

In any event, the estimation of phase error (using errorImag(n)) is filtered by loop filter 52 to provide a phase correction angle estimate φ(n). Sine/cosine signal generator 58 converts phase correction angle φ(n) to generate a signal which is mixed by multiplier 28 with the output of FFE 26 (FIG. 1) to de-rotate the output of FFE 26 to correct for carrier phase and frequency offsets. In the disclosed embodiment, sine/cosine generator 58 provides two output values corresponding to the sine and cosine of φ(n) derived from the phase error estimate errorImag(n), calculated by phase error detector 50 and loop filter 52. Sine/cosine values may be calculated by a suitable look-up table. Mixer 28 (FIG. 1) multiplies the complex signal derot(n) by the complex quantity cos φ(n)+j sin φ(n) (i.e. $e^{j\phi(n)}$).

Advantageously, loop filter 52 takes as adaptive gain inputs, the output of an adaptive gain circuit 54 and an associated low pass filter 56. Adaptive gain circuit 54 takes errorImag(n) and errorReal(n) and adapts the gain of loop filter 52 to optimize the performance of carrier recovery circuit 29.

Figure 6:
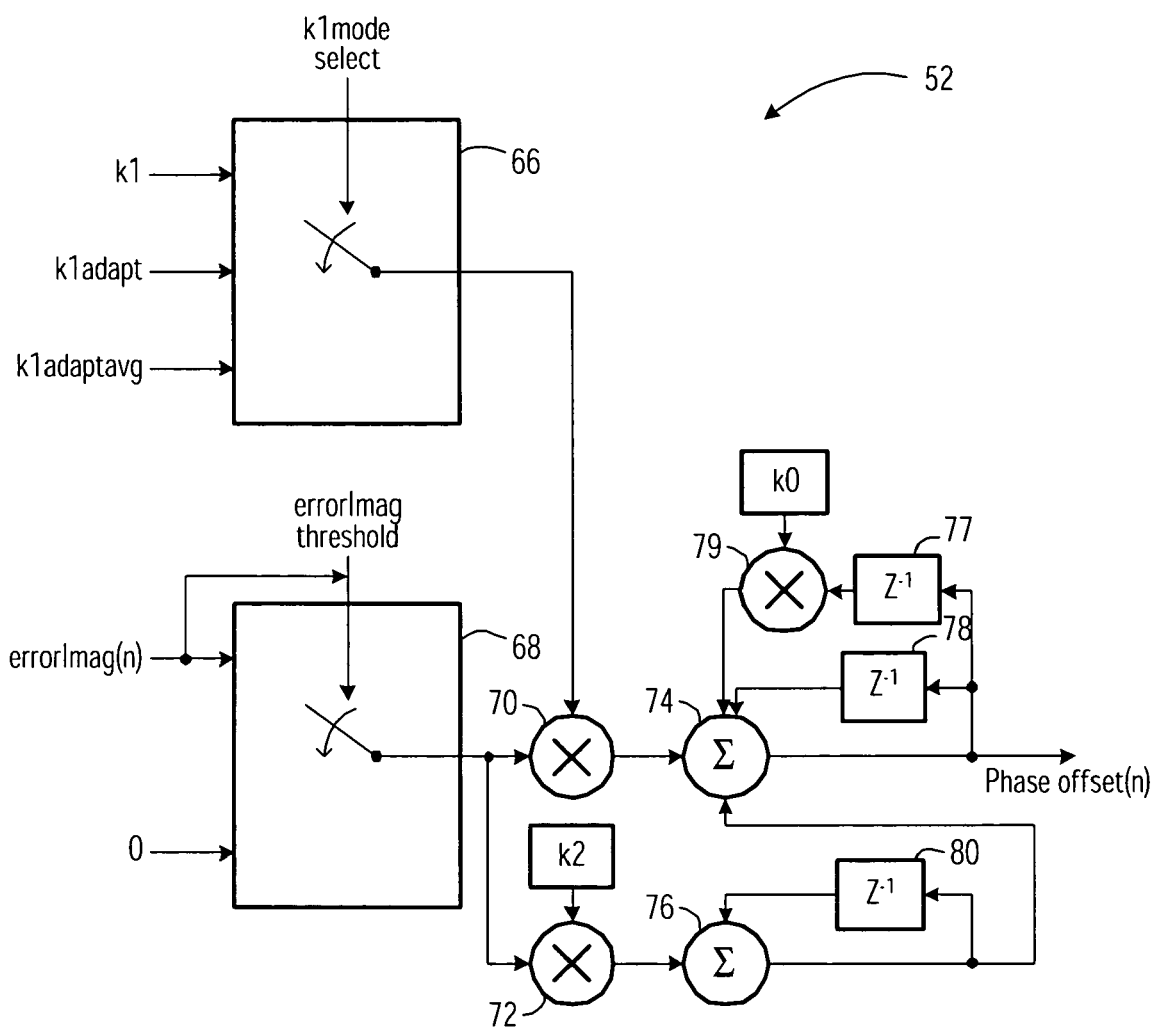
FIG. 6 is a simplified schematic block diagram of an adaptive loop filter of the carrier loop of FIG. 2.

FIG. 6 illustrates loop filter 52 of carrier loop 30. Example filter 52 is formed as second order phase locked loop (PLL) in order to track both the phase and frequency offset in the carrier. Loop filter 52 may be operated in one of three modes: a non-adaptive mode of operation and two adaptive modes. Again, the mode of operation of loop filter 52 is controlled by mode control block 60, in dependence on the operating state of receiver 10, and the quality of the received signal. The non-adaptive mode may be used during receiver initialization; the first adaptive mode may be used during signal tracking (high quality signal reception); the second adaptive mode may be used for low and intermediate quality signals.

Typically, the mode of operation for the phase error detector 50 is selected in tandem with a specific phase error detector. For instance the phase error detector of block 62e (QPSK_CL phase detector) will be used with a fixed gain algorithm, whereas the phase error detector of block 62a or block 62b (DD_CL; DD_CL_ALT phase detectors) will be used with an adaptive phase detector. In the depicted embodiment, and as shown in FIG. 6, all adaptive gains are computed in parallel, but are used by filter 52 only when needed. This mode of operation allows seamless transitions between fixed and variable gains.

In its non-adaptive mode, gain of loop filter 52 is programmable through three programmable registers k0, k1, k2. Suitable values of k0, k1 and k2 for the non-adaptive mode of operation may be hard coded, or provided by a controller (not shown) controlling overall operation of receiver 10.

As illustrated, a multiplier 70 multiplies errorImag(n) by a scale factor k1. errorImag(n) is similarly multiplied by k2 at multiplier 68. Delayed versions of multiplied signals are fed-back through delay blocks 78 and 80, and added by adders 74 and 76. A further delayed scaled version of the delayed multiplied signal, delayed by delay block 77 and scaled by the value of k0 by multiplier 79 is fed back to adder 74. As a result, the general equations for the loop filter 52, in its non-adaptive mode may be described as follows.

$$\theta(n)=\theta(n-1)+k2\,\text{errorImag}(n-1)$$

$$\phi(n)=(1-k0)\times\phi(n-1)+k1\times\text{errorImag}(n-1)+\theta(n)$$

where errorImag(n) is the output of phase error detector 50 for symbol S(n). θ(n) is now the frequency offset estimate, and φ(n) is phase offset estimate. As will be appreciated, filter 52, in its non-adaptive mode, is second order.

As will be appreciated, the above mathematical descriptions of the loop filter are in time domain. k0 increases the range of phase errors to which loop filter 52 can lock. k0 induces a low pass filtering of the phase estimation which contributes to reduce impulsive phase noise that may be triggered in the VSB receiver by abrupt changes in the equalizer coefficients.

Loop filter 52 may be used in its non-adaptive mode at start-up (as controlled by mode control block 60). In the event the errorImag(n) exceeds a threshold, as may for example be caused by noise, errorImag(n) is clipped at block 66. In the event the errorImag(n) does exceed the threshold, a value of zero (0) is provided by block 64, ensuring stability of loop 30.

In its adaptive modes k2 is not used (i.e. k2 is effectively set to zero) and k1adapt or k1adaptavg is used in place of k1. As a consequence loop filter 52 calculates $$\theta(n)=\theta(n-1)$$

$$\phi(n)=(1-k0)\times\phi(n-1)+k1\text{adapt}\times\text{errorImag}(n-1)+\theta(n)$$

[or $\phi(n)=(1-k0)\times\phi(n-1)+k1\text{adaptavg}\times\text{errorImag}(n-1)+\theta(n)$]

Of course filters 52 could be made adaptive in many other ways. In this mode, the frequency offset θ(n) is assumed to be correct and a constant over time. Unlike in its non-adaptive mode, exemplary filter 52 is first order in its adaptive mode. The phase offset ϕ(n) is calculated with a first order loop filter for which the gain is adaptive (i.e. the gain is a function of the past observation). The adaptive gain allows the carrier loop to adapt to abrupt variations of phase/frequency.

A person skilled in the art will now recognize that exemplary loop filter 52 calculates over time θ(n) that minimizes an error comparable to the error detected by phase detector 50, operating in its selected mode using gradient stochastic optimisation. The gradient stochastic optimization uses variable gain k1adapt computed by block 54. Variable gain k1adapt is calculated and adjusted adaptively as described below to track the variation of the channel over time which allows a trade-off between a fast change in the channel and an accurate estimate of the phase. As will become apparent, mathematically in an exemplary embodiment an optimal gain k1adapt is calculated to optimize a cost function. For example, in the case of the single-axis constant modulus, cost $$\sum_n (\text{Real}(y(n)*\exp(j\theta(n))^2-1)$$

is optimised with respect θ(n) and the gain k1 under the constraint that the gradient estimate of θ(n) can be expressed in the form θ(n)=θ(n-1)+k1Δ, where Δ is the derivative of the constant modulus cost function with respect to θ. To estimate k1adapt, another gradient optimisation with respect k1 is used.

Figure 7:
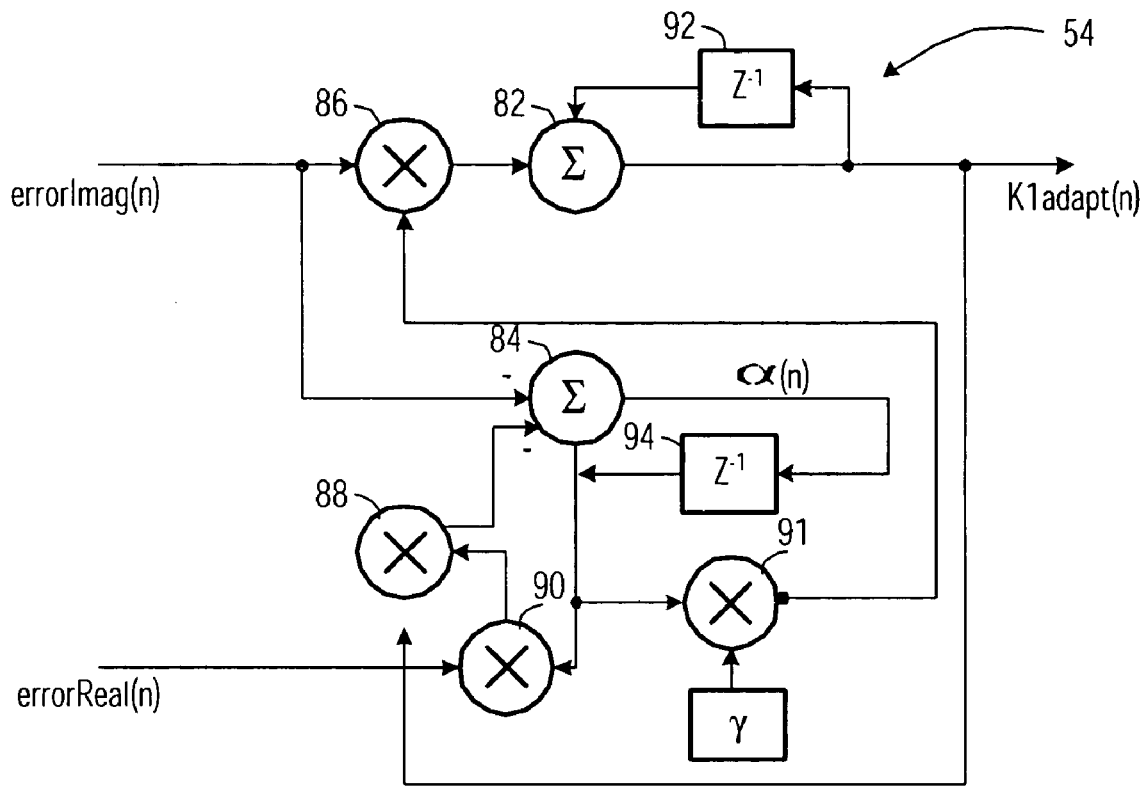
FIG. 7 is a simplified schematic block diagram of an adaptive gain circuit of the carrier loop of FIG. 2.

FIG. 7 schematically illustrates the adaptive gain controller 54 of carrier loop 30. Adaptive gain controller 54 calculates k1adapt(n) from past values of the phase error as estimated by phase error detector 50.

Summers 82, 84 multipliers 86, 88, 90, 91 and delay blocks 92, 94 are arranged to calculate a loop filter gain k1adapt(n) for each symbol in accordance with the equations, $$k1\text{adapt}(n)=k1\text{adapt}(n-1)+2\gamma\alpha(n-1)\text{errorImag}(n-1))$$

$$\alpha(n)=(1-k1\text{adapt}(n-1)*errorReal(n)*\alpha(n-1)-\text{errorImag}(n))$$

where γ is a small positive auxiliary step size.

Figure 8:
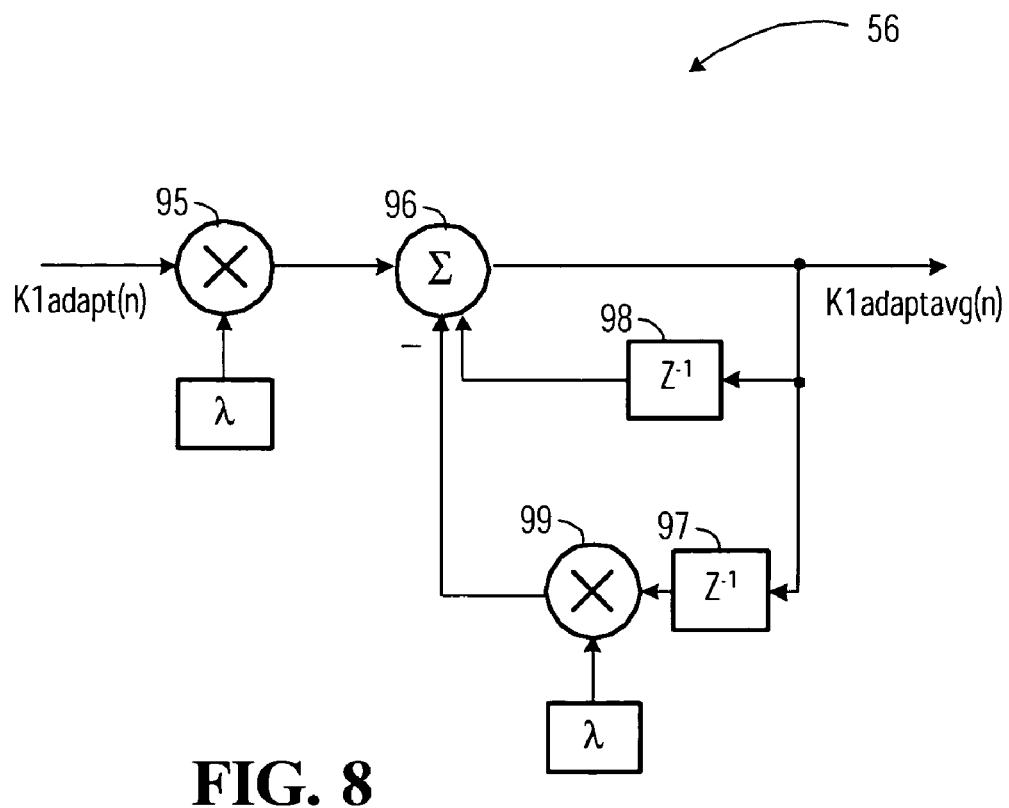
FIG. 8 is a simplified schematic block diagram of a low pass filter of the carrier loop of FIG. 2.

Low pass filter 56 additionally calculates k1adaptavg(n), a filtered, averaged version of k1adapt(n). The structure of an example low pass filter 56 is illustrated schematically in FIG. 8. Example low pass filter 56 sums a delayed version of k1adapt, k1adapt(n-1) to the present k1adapt(n) using summer 96 and delay blocks 97, 98 and multipliers 95, 99 to calculate $$k1\text{adaptavg}(n)=\lambda*k1\text{adapt}(n)+(1-\lambda)*k1\text{adaptavg}(n-1)$$

k1adaptavg(n) may be used in the second adaptive mode of filter 52 instead of k1adapt(n). λ controls the bandwidth of filter 52. Typically λ is selected close to 1. Suitable values of λ and γ may be hard coded, or provided by a controller (not shown) controlling overall operation of receiver 10.

Conveniently, adapting the gain and bandwidth of loop filter 52 with the estimate of the phase and frequency error allows carrier loop 30 to more quickly track changes in the phase error, while reducing jitter.

Advantageously use of a first order loop 52 with a low pass filter, allows loop gain, k1adapt, to be computed by block 54 as a function of phase detector error to minimize error in the decoded symbol y(n) in much the same way as the phase offset estimate ϕ(n) is calculated to minimize error in the decoded symbol y(n) by block 52. This allows adjustment of the bandwidth of loop filter 52 continuously over time. Moreover, as the loop gain k1adapt is adaptive changing on a symbol by symbol basis, loop 52 provides performance of a second order loop which allows tracking of frequency variation, using only a first order loop. Furthermore, this approach takes into account any hidden parametric model affecting the variations of the RF signal frequency. Indeed, if we assume that the phase information at time n can be described as a perturbation of the phase at time n-1, (i.e. that there is a correlation between two consecutives samples in the form described above, namely θ(n)=θ(n-1)+k1Δ), finding the gain k1 at each time n may improve the estimation of θ(n).

Conveniently, receiver 10, using adaptive loop filter 52 may better track time varying channels such as an RF channel for a moving receiver. Similarly, the example receiver may better track a signal whose frequency is changing over time due to a Doppler shift. This may occur when a vehicle, such as a car or an airplane, is moving in the vicinity of a stationary receiver. Without adapting loop filter 52, it is difficult to first detect a Doppler shift and then compute optimum gains k1, k2 as these change continuously. If not processed adequately the phase correction would generally lead to a corruption of the symbol y(n) which will lead ultimately to a failure of the equalizer in the tracking mode.

Figure 9:
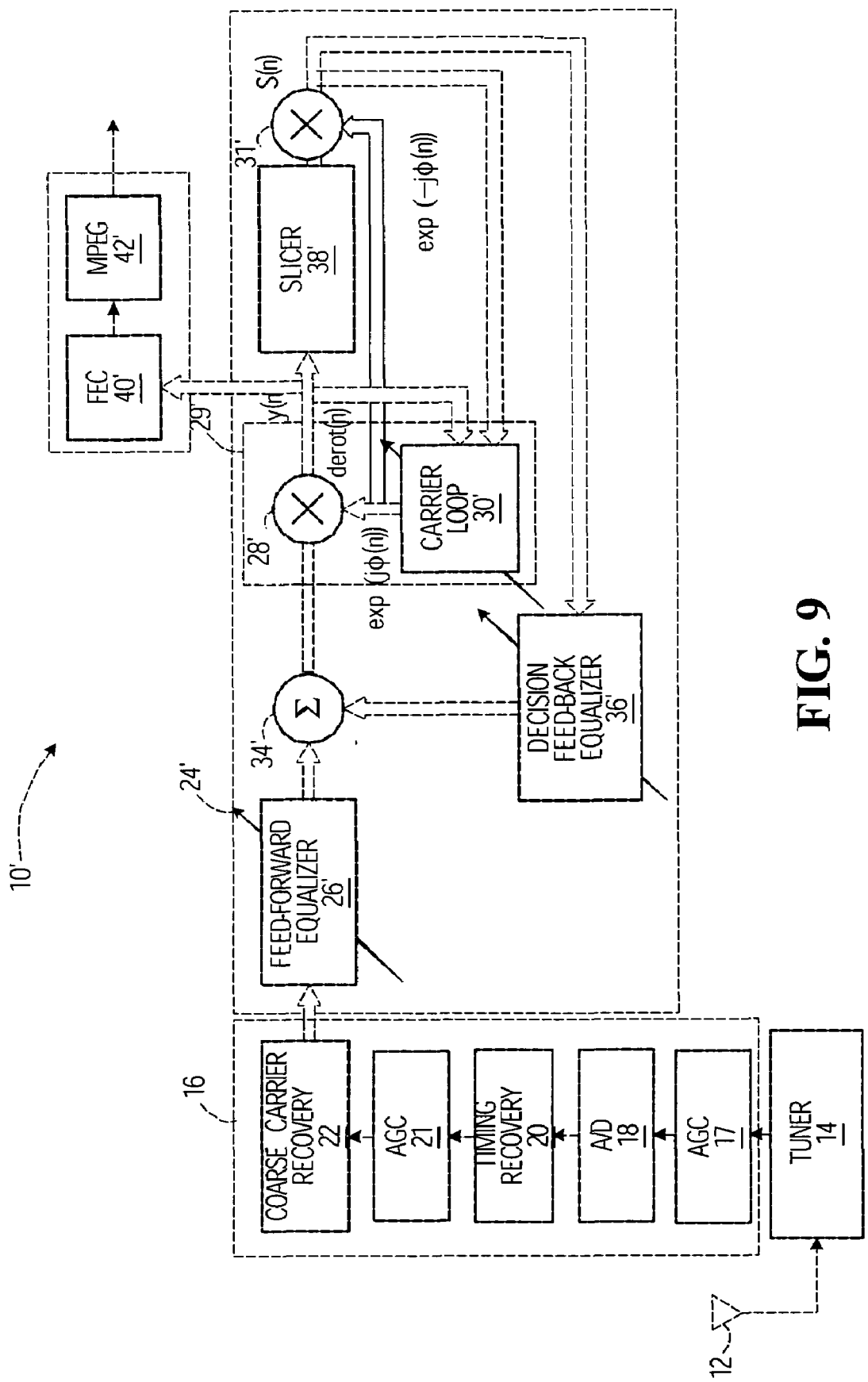
FIG. 9 is a simplified schematic block diagram of a QAM receiver exemplary of an embodiment of the present invention.

The above noted description and FIGS. 1-8 detail a VSB receiver. A person of ordinary skill should now however appreciate that the invention may easily be embodied in other receivers, such as QAM receivers. To that end, FIG. 9 illustrates a QAM receiver 10', similar to VSB receiver 10 and exemplary of an embodiment of the present invention. As noted, however, for QAM, two orthogonal data streams are transmitted at the same time. One constitutes the real portion of a complex data symbol, the other the imaginary portion. These are typically represented as an I data stream and a Q data stream. For QAM64, each symbol's I value takes one of eight relative values: -7, -5, -3, -1, 1, 3, 5, and 7, so does the Q value. For QAM256 each symbol's I value takes one of sixteen values: -15, -13, -11, -9, -7, -5, -3, -, 1, 3, 5, 7, 9, 11, and 15 so does the Q value.

Receiver 10' is similar to receiver 10 sharing many identical components. As such, like components have been marked with like numerals and will not be further detailed herein. Components similar to those of receiver 10, but adapted to operate on a QAM stream have been but including a prime (') symbol. Adaptation of these components to process QAM signals will be apparent to those of ordination skill. For example, slicer 38' may produce complex signals S(n) in the QAM constellation from complex signals y(n). FFE 26' and DFE 36' are formed with complex filter parameter suitable for QAM signals. Interconnection between components reflects complex quantities, including real and imaginary data, transferred between functional blocks.

Moreover, as the signal is complex, block 32 (FIG. 1) is not required, and the phase error may be derived by loop filter 52 from S(n) and y(n). Indeed, use of derot(n) to produce a phase error estimate of the carrier is no longer required. Similarly, phase errors may be calculated by the equivalents of blocks 62a-62e and 64a-64b and 100a-100b using complex valued S(n), y(n) and qpsk (i.e. actual $S_i(n)$, $S_q(n)$, $y_i(n)$, $y_q(n)$ $qpsk_i(n)$, $qpsk_q(n)$) using these blocks. Loop filter, adaptive gain circuit, and low pass filter of carrier loop 30' may otherwise be formed in manners identical to loop filter 52, adaptive gain control 54 and low pass filter 56 of receiver 10.

As the signal provided to slicer 38' is complex, carrier recovery circuit 29' (and particularly mixer 28') is downstream of summer 34 (unlike in receiver 10). Similarly, a further mixer 31' re-rotates the output of slicer 38' by an angle of $-\phi(n)$ so as not to lose information in the signal output by slicer 38', indicative of a phase error in the received signal.

Conveniently, as receiver 10 and receiver 10' use common and similar components, these receivers could be combined to form a multi-mode receiver capable of receiving VSB or QAM signal. VSB/QAM mode could be toggled externally.

Of course, the above described embodiments are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A digital receiver for demodulating a digital signal modulated onto a carrier, comprising:
   a tuner;
   an analog to digital converter, for digitizing a channel tuned by said tuner to provide a digitized channel;
   a coarse carrier recovery circuit for extracting said digital signal from said digitized channel at near baseband;
   a feed forward equalizer receiving said digital signal at near baseband and outputting a feed forward equalized signal;
   a fine carrier recovery circuit for phase shifting said feed forward equalized signal by a phase correction angle to adjust for remaining offsets in phase and frequency of said feed forward equalized signal attributable to phase and frequency offsets in said carrier;
   said fine carrier recovery circuit comprising a phase error detector for estimating errors in real and imaginary components of said digital signal, a filter for filtering the estimate of phase error in said carrier to control said phase correction angle, wherein at least one filter parameter of said filter varies adaptively with said phase error, and wherein said phase error detector has at least two modes of operation for uniquely estimating errors in said imaginary component in each of said at least two modes, and wherein a first of said two modes is for high guality signals.

2. The receiver of claim 1, wherein said fine carrier recovery circuit further comprises a multiplier and a signal generator for generating a signal to multiply said feed forward equalized signal to phase shift said feed forward equalized signal.

3. The receiver of claim 2, further comprising a threshold slicer for determining a quantized modulated signal corresponding to said digital signal.

4. The receiver of claim 2, wherein said multiplier comprises a sine generator for generating a signal representative of the sine of said phase correction angle.

5. The receiver of claim 3, wherein said filter comprises a phase-locked loop, having an adjustable bandwidth, varied adaptively with said estimate of said phase error.

6. The receiver of claim 5, wherein said phase-locked loop calculates said phase correction angle, as a function of the imaginary portion of said estimate of said phase error.

7. The receiver of claim 5, wherein said phase-locked loop calculates said phase correction angle, as a function of the imaginary portion of said estimate of said phase error multiplied by an adaptive gain.

8. The receiver of claim 7, wherein said fine carrier recovery circuit further comprises an adaptive gain controller for calculating said adaptive gain based on said estimate of said phase error.

9. The receiver of claim 8, wherein said digital signal comprises a plurality of symbols, and said adaptive gain controller calculates said adaptive gain for a current symbol using the imaginary portion of said estimate of said phase error for said current symbol multiplied by an adaptive gain for a previous symbol.

10. The receiver of claim 9, wherein said adaptive gain controller calculates said adaptive gain based on said estimate of said phase error in order to minimize an error in said symbols as demodulated from said carrier.

11. The receiver of claim 8, wherein said digital signal comprises a series of symbols, and said adaptive gain controller calculates said adaptive gain for the nth of said symbols as, $$k1\text{adapt}(n)=k1\text{adapt}(n-1)+2\gamma\alpha(n-1)\text{errorImag}(n-1)),$$

where $$\alpha(n)=(1-k1\text{adapt}(n-1)*\text{errorReal}(n)*\alpha(n-1)\text{ errorImag}(n))$$

and $\gamma$ is a constant, errorImag(n−1) is an estimate of the imaginary portion said phase error for a previously demodulated one of said symbols;
errorReal(n) is an estimate of the real portion said phase error for said currently demodulated symbol.

12. The receiver of claim 8, further comprising a low pass filter for filtering said adaptive gain.

13. The receiver of claim 5, wherein said digital signal comprises a series of symbols, and said phase-locked loop calculates said phase correction angle $\phi(n)$ for the nth of said symbols, as $$\phi(n)=(1-k0)\text{x}\phi(n-1)+k1\text{adapt }\text{xerrorImag}(n-1)+\theta$$

where$\theta$ is a constant; k0 is a gain value; errorImag(n−1) is an estimate of the imaginary portion said phase error for a previously decoded symbol; and said at least one filter parameter that is varied adaptively comprises k1adapt.

14. The receiver of claim 3, wherein said fine carrier recovery circuit further comprises a multiplier and a signal generator for generating a signal to multiply said feed forward equalized signal to phase shift said feed forward equalized signal.

15. The receiver of claim 13, further comprising a phase error detector that estimates said imaginary portion of said phase error as one of $(y_i(n)*S_q(n)-y_q(n)S(n))*$errorNormImag; sign(derot$_q$(n))*(yi(n)−S$_i$(n))*errorNormImag; derot$_i$(n)*S$_q$(n)*errorNormImag;−derot$_q$(n)*S$_i$(n)*errorNormImag; and $y_i(n)*qpsk_q(n)-y_q(n)*qpsk_i(n)$;
where $y_i(n)$ and $y_q(n)$ are derived from the input of said threshold slicer; $S_i(n)$ and $S_q(n)$ are derived from the output of said threshold slicer; errorNormImag=$1/(2\pi*(|S_i(n)|+|S_q(n)|))$, where $|S_i(n)|$ and $|S_q(n)|$ are the magnitude of $S_i(n)$ and $S_q(n)$, respectively; $qpsk_i(n)=1/(16*\pi)$ if $y_i(n)>0$; $qpsk_i(n)=-1/(16*\pi)$ if $y_i(n)<0$; $qpsk_q(n)=1/(16*\pi)$ if $y_q(n)>0$; $qpsk_q(n)=-1/(16*\pi)$ if $y_q(n)<0$; derot$_i$(n) and derot$_q$(n) represent real and imaginary portions of an output of said fine carrier recovery circuit, respectively; and sign(derot$_q$(n)) extracts the sign of derot$_q$(n).

16. The receiver of claim 3, further comprising a decision feedback equalizer providing a filtered delayed version of said quantized modulated signal to an input of said threshold slicer.

17. The receiver of claim 16, wherein said estimate of phase error is determined as a function of signals to said input of said slicer and said quantized modulated signals output by said slicer.

18. The receiver of claim 17, wherein said estimate of phase error is further determined as a function of said output of said fine carrier recovery circuit.

19. The receiver of claim 1, wherein said digital signal comprises a vestigial sideband modulated (VSB) signal.

20. The receiver of claim 1, wherein said digital signal comprises a quadrature amplitude modulated (QAM) signal.

21. The receiver of claim 1, formed as an integrated circuit.

22. In a digital receiver for receiving a signal modulated onto a carrier, a method comprising:
reducing multi-path interference in said signal, by filtering said signal through a feed-forward equalizer to produce a feed forward-equalized signal;
determining an estimate of a phase error in said signal, performed in two modes by estimating errors in an imaginary component of said signal uniquely in each of two modes, and wherein a first of said two modes is for high quality signals,
filtering said estimate through a filter having at least one adjustable filter parameter to produce a phase correction signal;
varying said adjustable filter parameter using said estimate of phase error;
multiplying said feed forward equalized signal by said phase correction signal to de-rotate said feed forward equalized signal.

23. The method of claim 22, wherein said adjustable filter parameter comprises a bandwidth of said filter.

24. The method of claim 22, wherein said phase correction signal is calculated as a function of the imaginary portion of said estimate of said remaining phase error.

25. The method of claim 22, wherein said phase-correction signal is calculated as a function of the imaginary portion of said estimate of said remaining phase error multiplied by an adaptive gain.

26. The method of claim 25, wherein said adjustable parameter comprises said adaptive gain, and wherein said adaptive gain is calculated based on said estimate of said phase error.

27. The method of claim 25, wherein said signal comprises a plurality of symbols, said adaptive gain for a current symbol is calculated using the imaginary portion of said phase error multiplied by an adaptive gain for a previous symbol.

28. The method of claim 26, wherein said adaptive gain is calculated based on said estimate of said phase error in order to minimize an error in said symbols as demodulated from said carrier.

29. The method of claim 25, wherein said signal comprises a series of symbols, and said adaptive gain for the nth of said symbols is calculated as, $$k1\text{adapt}(n)=k1\text{adapt}(n-1)+2\gamma\alpha(n-1)\text{errorImag}(n-1)),$$

where $$\alpha(n)=(1-k1\text{adapt}(n-1)*\text{errorReal}(n)*\alpha(n-1)-\text{errorImag}(n))$$

and $\gamma$ is a constant, errorImag(n−1) is an estimate of the imaginary portion of said phase error for a previously decoded symbol;
errorReal(n) is an estimate of the real portion of said remaining phase error for said currently demodulated symbol.

30. The method of claim 22, further comprising providing said feed forward equalized signal to the input of a slicer and at said slicer forming a quantized signal from said input.

31. The method of claim 30, wherein said determining comprises estimating a phase difference between a signal at said input of said slicer and said quantized signal.

32. The method of claim 31, further comprising filtering said quantized signal, and feeding said filtered quantized signal back to said input of said slicer to reduce multi-path interference in said signal.

33. The method of claim 32, wherein said quantized signal comprises allowable quadrature amplitude modulated (QAM) symbols.

34. The method of claim 32, wherein said quantized signal comprises allowable vestigial side-band (VSB) modulated symbols.

35. A digital receiver for demodulating a digital signal modulated onto a carrier, to produce a demodulated digital signal, said receiver comprising:
a de-rotator for phase shifting an equalized version of said digital signal by a phase correction angle to adjust for remaining offsets in phase and frequency of an equalized version of said digital signal attributable to phase and frequency offsets in said carrier;
a phase error detector for estimating errors in real and imaginary components of said digital signal to provide an estimate of phase error in said demodulated signal; and
a filter in communication with said de-rotator, for filtering said estimate of a phase error in said demodulated digital signal to control said phase correction angle, wherein at least one filter parameter of said filter varies adaptively with said phase error;
wherein said phase error detector has at least two modes of operation for uniquely estimating errors in said imaginary component in each of said at least two modes, and wherein a first of said two modes is for high quality signals.

36. The receiver of claim 35, wherein said filter comprises a phase-locked loop, having an adjustable bandwidth, varied adaptively with said estimate of said phase error.

37. The receiver of claim 36, wherein said phase-locked loop calculates said phase correction angle, as a function of the imaginary portion of said estimate of said phase error.

38. The receiver of claim 36, wherein said phase-locked loop calculates said phase correction angle, as a function of the imaginary portion of said estimate of said phase error multiplied by an adaptive gain.

39. The receiver of claim 38, wherein said receiver further comprises an adaptive gain controller for calculating said adaptive gain based on said estimate of said phase error.

40. The receiver of claim 39, wherein said digital signal comprises a plurality of symbols, and said adaptive gain controller calculates said adaptive gain for a current symbol using the imaginary portion of the phase error multiplied by an adaptive gain for a previous symbol.

41. The receiver of claim 40, wherein said adaptive gain controller calculates said adaptive gain based on said estimate of phase error in order to minimize an error in said symbols as demodulated from said carrier.

42. The receiver of claim 39, wherein said signal comprises a series of symbols, and said adaptive gain controller calculates said adaptive gain for the nth of said symbols as, $$k1\text{adapt}(n)=k1\text{adapt}(n-1)+2\gamma\alpha(n-1)\text{errorImag}(n-1)),$$

where $$\alpha(n)=(1-k1\text{adapt}(n-1)*\text{errorReal}(n)*\alpha(n-1)\text{ errorImag}(n))$$

and $\gamma$ is a constant, errorImag(n−1) is an estimate of the imaginary portion said phase error for a previously demodulated symbol; errorReal(n) is an estimate of the real portion of said phase error for said currently demodulated symbol.

43. The receiver of claim 38, further comprising a low pass filter for filtering said adaptive gain.

44. The receiver of claim 36, wherein said signal comprises a series of symbols, and said phase-locked loop calculates said phase correction angle $\phi(n)$ for the nth of said symbols, as $$\phi(n)=(1-k0)\text{x}\phi(n-1)+k1\text{adapt }\text{xerrorImag}(n-1)+\theta$$

where $\theta$ is a constant; k0 is a gain value; errorImag(n−1) is an estimate of the imaginary portion said phase error for a previously decoded symbol; and said at least one filter parameter that is varied adaptively comprises k1adapt.

* * * * *